(12) United States Patent
Mohan et al.

(10) Patent No.: US 11,381,962 B1
(45) Date of Patent: Jul. 5, 2022

(54) INTEGRATION OF CONTENT DISTRIBUTION SYSTEMS WITH DEVICE DETECTION SYSTEMS IN PHYSICAL VENUES

(71) Applicant: Zenreach, Inc., San Francisco, CA (US)

(72) Inventors: Kapil Mohan, Sunnyvale, CA (US); Kai Umezawa, San Francisco, CA (US); Muhammad Ahsan Mirza, Kitchener (CA); Wayne Renaud, Kitchener (CA); John Zupancic, Kitchener (CA)

(73) Assignee: ADENTRO, INC., San Francisco, CA (US)

( * ) Notice: Subject to any disclaimer, the term of this patent is extended or adjusted under 35 U.S.C. 154(b) by 0 days.

(21) Appl. No.: 17/164,258

(22) Filed: Feb. 1, 2021

(51) Int. Cl.
| | |
|---|---|
| *H04W 12/02* | (2009.01) |
| *H04W 4/021* | (2018.01) |
| *H04W 4/029* | (2018.01) |
| *H04W 12/63* | (2021.01) |

(52) U.S. Cl.
CPC ........... *H04W 12/02* (2013.01); *H04W 4/021* (2013.01); *H04W 4/029* (2018.02); *H04W 12/63* (2021.01)

(58) Field of Classification Search
CPC ............... G06Q 30/02; G06Q 30/0261; G06Q 30/0255; G06Q 30/0256; G06Q 30/0269; G06Q 20/384; G06Q 30/0205; G06Q 30/0224; G06Q 30/0233; G06Q 30/0236; G06Q 30/0276; G06Q 30/0207; G06Q 30/0246; G06Q 30/0251; G06Q 30/0266; G06Q 50/01; G06Q 30/0271; G06Q 30/0625; H04W 4/02; H04W 4/029; H04W 4/025; H04W 4/38; H04W 4/80; H04W 4/30; H04W 4/21; H04W 4/021; H04W 4/024; H04W 4/14; H04W 4/24; H04W 8/245; H04W 12/06; H04W 12/08;
(Continued)

(56) References Cited

U.S. PATENT DOCUMENTS

| | | | | |
|---|---|---|---|---|
| 2008/0248815 A1* | 10/2008 | Busch | ................ | G06Q 30/0261 455/456.5 |
| 2012/0130796 A1* | 5/2012 | Busch | ................ | G06Q 30/0267 705/14.36 |
| 2017/0257454 A1* | 9/2017 | Hughes | ................ | H04W 12/084 |

OTHER PUBLICATIONS

PCT International Search Report and Written Opinion, PCT Application No. PCT/US2022/014398, dated Feb. 23, 2022, eight pages.

* cited by examiner

*Primary Examiner* — Kwasi Karikari
(74) *Attorney, Agent, or Firm* — Fenwick & West LLP

(57) ABSTRACT

A device detection system is configured to determine whether a device is located within a venue. The device detection system provides user identifiers associated with a device to an anonymization server. The anonymization server provides anonymous identifiers to the device detection system corresponding to the user identifiers. A content distribution system provides content items for a campaign associated with the venue to users. The content distribution system provides user identifiers to the anonymization server and receives anonymous identifiers from the anonymization server. The content distribution system provides the anonymous identifiers to the device detection system. The device detection system compares the sets of anonymous identifiers to identify users that received a content item and subsequently visited the venue.

20 Claims, 5 Drawing Sheets

(58) Field of Classification Search
CPC ....... H04L 67/22; H04L 67/18; H04L 67/306; H04L 67/303
See application file for complete search history.

US 11,381,962 B1

INTEGRATION OF CONTENT DISTRIBUTION SYSTEMS WITH DEVICE DETECTION SYSTEMS IN PHYSICAL VENUES

BACKGROUND

This disclosure relates generally to machine-learning technology, and more specifically to machine-learning technology for detecting the location of mobile devices relative to a location, venue, or geographic boundary.

It is useful for entities to understand foot traffic within a venue associated with the entity. In particular, it would be useful for entities to understand whether digital content distribution results in increased foot traffic within the venue. Typical systems for tracking foot traffic may utilize GPS technology, social media check-ins, or other methods of locating users. Many of these systems require a user to perform an action, such as to enable GPS tracking of the device or interact with an application on the device. Additionally, it can be difficult for an entity to determine based on GPS data whether a user is located within a venue or nearby but outside the venue. Furthermore, it is important to protect personally identifiable information of individuals. Entities and content distribution systems may be unable to share personally identifiable information with each other regarding users that received a content item or visited a venue of an entity. Thus, it may be difficult to determine how many individuals received a content item and subsequently visited a venue of an entity.

SUMMARY

The systems described herein integrate data obtained via a device detection system with data describing users that receive content items as part of a campaign. The device detection system is configured to determine whether a device is located within a venue. The device detection system provides user identifiers to an anonymization server. The anonymization server provides anonymous identifiers to the device detection system which correspond to the device user identifiers. A content distribution system provides content items, for instance content associated with a campaign associated with the venue, to users. The content distribution system provides user identifiers to the anonymization server and receives anonymous identifiers from the anonymization server. The content distribution system provides the anonymous identifiers to the device detection system. The device detection system compares the anonymous identifiers to determine data describing the users that received a content item and subsequently visited the venue.

In some embodiments, the system is configured to detect, by a wireless access point of a venue, a plurality of pings from a plurality of devices. The system determines, based on the plurality of pings, that the plurality of devices are located within the venue. The system obtains, for each of the plurality of devices, a device user identifier associated with a user of each device. The system transmits the device user identifiers to an anonymization server. The system receives, from the anonymization server, a first set of anonymous identifiers corresponding to the device user identifiers. The system receives, from a content distribution system, a second set of anonymous identifiers corresponding to users that were served content by the content distribution system. The system selects a subset of the plurality of devices corresponding to users that were served content by the content distribution system and that subsequently visited the venue by identifying anonymous identifiers common to both the first set of anonymous identifiers and the second set of anonymous identifiers. The system provides, to an entity associated with the venue, a report comprising demographic information for the selected subset of the plurality of devices.

In some embodiments, the system is configured to receive, from a device connecting to a wireless access point in a first venue, an email address of a user. The system determines that the device is located within a second venue. The system transmits the email address associated with the device to an anonymization server. The system receives, from the anonymization server, a first anonymous identifier corresponding to the email address. The system receives a second anonymous identifier from a content provider. The system determines, in response to the first anonymous identifier matching the second anonymous identifier, that a content item for the second venue was provided to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

It is beneficial for entities to know whether a customer that was presented content related to an entity associated with a venue visits the venue. The systems described herein detect wireless pings from mobile devices. The systems obtain device parameters from the wireless pings, such as a signal strength of a ping, a time of the ping, a dwell time between a first ping and a last ping from a device, whether the ping was received during hours of operation of the venue, a signal strength of pings from other devices that connected to the wireless access point, a manufacturer identifier of a media access control (MAC) address of the device, and characteristics of data received from employee devices. The systems evaluate the device parameters to determine whether a mobile device entered the venue or remained outside the venue.

The systems provide device user identifiers to an anonymization server. The systems receive anonymous identifiers for devices that entered the venue. A content distribution system provides digital content to users. The content distribution system provides user identifiers to the anonymization server and receives corresponding anonymous identifiers for users that received the digital content. The systems match the anonymous identifiers received from the anonymization server to identify data describing users that received the digital content and subsequently visited the venue.

System Architecture

Figure 1:
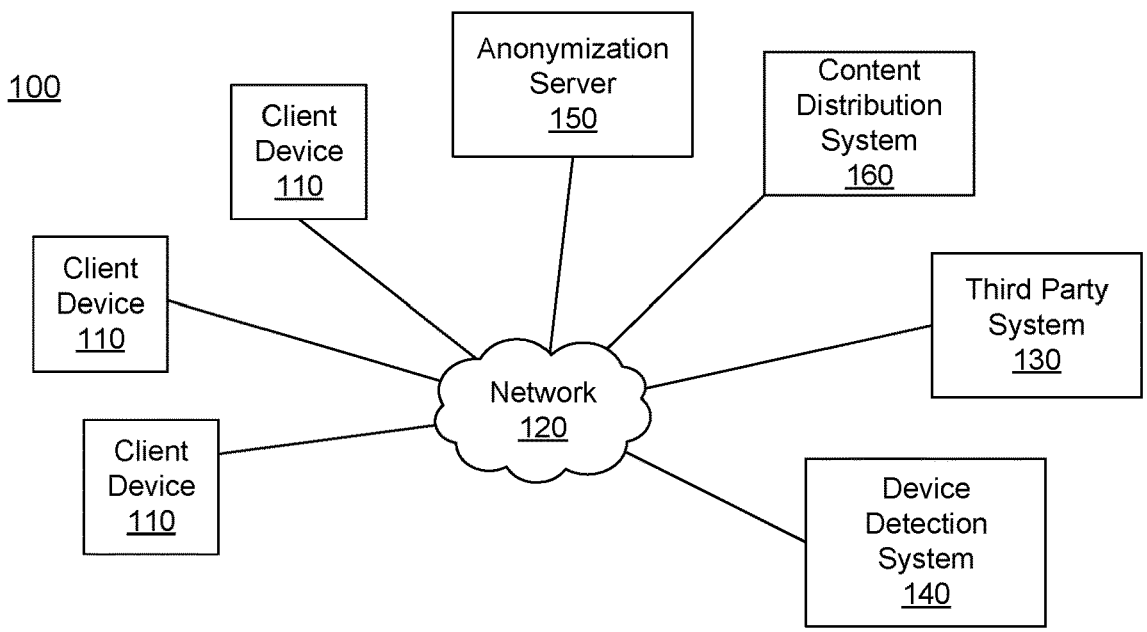
FIG. 1 is a block diagram of a system environment in which a device detection system operates, according to an embodiment.

FIG. 1 is a block diagram of a system environment 100 for a device detection system 140. The system environment 100 shown by FIG. 1 comprises one or more client devices 110, a network 120, one or more third-party systems 130, and the device detection system 140. In alternative configurations, different and/or additional components may be included in the system environment 100.

The client devices 110 are one or more computing devices capable of transmitting a detectable signal to the device detection system 140. In one embodiment, a client device 110 may be a device having computer functionality, such as a mobile telephone, a smartphone, a laptop, an automobile with an onboard computer system, or another suitable device. A client device 110 is configured to communicate via the network 120.

The client devices 110 are configured to communicate via the network 120, which may comprise any combination of local area and/or wide area networks, using both wired and/or wireless communication systems. The network 120 may comprise a wireless access point located within a venue. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the device detection system 140, which is further described below in conjunction with FIG. 2. In one embodiment, a third party system 130 is a content provider (such as a video cloud server, an advertising server, an image database, and the like) configured to provide content directly or indirectly to a client device 110. In other embodiments, a third party system 130 provides content or other information for presentation via a client device 110. A third party system 130 may also communicate information to the device detection system 140, such as content items (such as images, media, advertisements, text messages, and the like), information describing content items that were previously provided to the client devices 110, or information about an application provided by the third party system 130.

The device detection system 140 is configured to determine whether a client device 110 entered a venue. The device detection system 140 may comprise a combination of hardware and software. In some embodiments, the device detection system 140 may comprise a cloud computing system. All or a portion of the device detection system 140 may be located external to a venue. In some embodiments, the device detection system 140 may be located within a venue. The device detection system 140 may be in communication with an access point located within a venue. The access point may be a component of the device detection system 140. The device detection system 140 is further described with respect to FIGS. 2-6.

The anonymization server 150 is configured to receive a user identifier, which may comprise personally identifiable information, and convert the user identifier into an anonymous identifier that does not comprise personally identifiable information. The anonymization server 150 may store user profiles that comprise information describing a user or device, such as a name, email address, phone number, MAC address, cookie value, phone number, residential address, etc. Each user profile may be associated with multiple devices associated with a user, such as a cellphone, a laptop, a desktop, etc. Each user profile may also be associated with a unique anonymous identifier. The anonymous identifier may comprise an alphanumeric string. The anonymization server 150 is configured to receive a set of user identifiers from the device detection system 140 or the content distribution system 160, convert the set of user identifiers to the corresponding anonymous identifiers, and transmit the anonymous identifiers to the party that provided the set of user identifiers.

The content distribution system 160 is configured to provide content items to users. The content items may comprise digital advertisements, articles, videos, images, or any other suitable type of digital information which may be presented on a client device 110. The content distribution may target the content items based on user attributes stored by the content distribution system 160. For example, the user attributes may comprise demographic information, such as user ages, genders, income levels, locations, etc. In some embodiments, the user attributes may comprise information obtained via a tracking pixel (cookie), such as browsing history, clickstream data, or other browsing activity. The content distribution system 160 is configured to provide a set of user identifiers to the anonymization server 150 corresponding to users that received a content item related to an entity. An entity may refer to a company, organization, or individual associated with a physical venue location. The user identifiers may comprise personally identifiable information, such as an email address, cookie value, or other information which allows the anonymization server 150 to identify the user. The content distribution system 160 is configured to receive a set of anonymous identifiers corresponding to the user identifiers from the anonymization server 150. The content distribution system 160 is configured to provide the set of anonymous identifiers to the device detection system 140. The content distribution system 160 may provide additional information about the anonymous identifiers to the device detection system 140, such as demographic information describing the set of users that received the content item.

Figure 2:
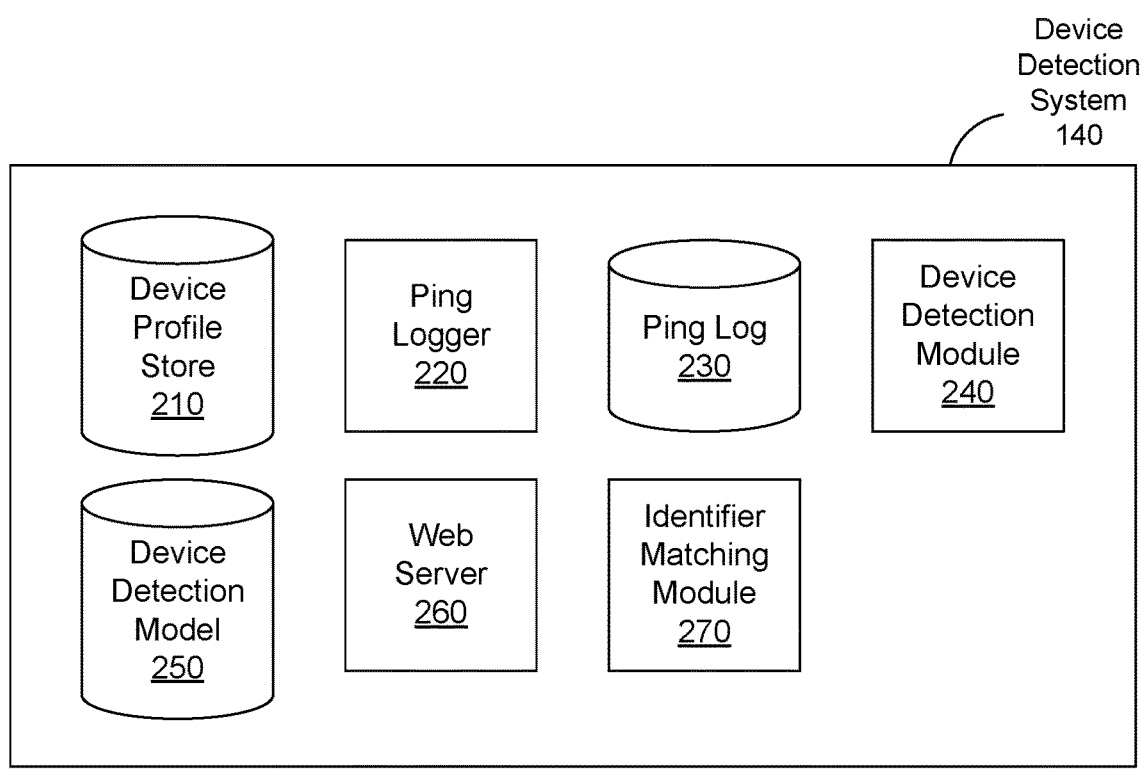
FIG. 2 is a block diagram of a device detection system, according to an embodiment.

FIG. 2 is a block diagram of an architecture of the device detection system 140. The device detection system 140 shown in FIG. 2 includes a device profile store 210, a ping logger 220, a ping log 230, a device detection module 240, a device detection log 250, a web server 260, and an identifier matching module 270. In other embodiments, the device detection system 140 may include additional, fewer, or different components for various applications. Conventional components such as network interfaces, security functions, load balancers, failover servers, management and network operations consoles, and the like are not shown so as to not obscure the details of the system architecture.

The device detection system 140 is configured to determine whether a client device 110 entered a venue. The device detection system 140 may be associated with multiple venues. A venue refers to a physical location of an entity, such as a retail store, a restaurant, a museum, a merchant location, a service provider, etc. Each venue is associated with one or more geographic boundaries.

The device profile store 210 is configured to store profiles for a plurality of devices. The device profile store 210 may comprise one or more databases. A device profile includes information about a device or a user associated with the device that was explicitly shared by the user and may also include profile information inferred by the device detection system 140. In one embodiment, a device profile includes multiple data fields, each describing one or more attributes of the corresponding online system user. Examples of information stored in a device profile include a MAC address, an email address, phone number, username, password, a description of content items provided to the device, etc. A device profile in the device profile store 205 may also maintain references to actions by the corresponding user performed on the device, such as clicking on a content item.

A device profile may be created in the device profile store 210 based on various actions. In some embodiments, a device profile may be created in response to a device connecting to an access point of any of a plurality of venues. The venue may require that a user provide an email address, username, or other identifying info to connect to a wireless network provided by an access point. The device detection system 140 may obtain additional information, such as the MAC address, from the device. In some embodiments, a device profile may be created in response to the device detection system 140 detecting a ping from the device, regardless as to whether the device connected to a wireless network. The device detection system 140 may obtain a MAC address for the device, and if the device profile store 210 does not contain a device profile with a corresponding MAC address, the device profile store 210 may create a new device profile. In some embodiments, the device detection system 140 may obtain device profile from third parties, such as by purchasing device profile data, and the device profile store 210 may create new device profiles for the devices. Each time a device is detected by the device detection system 140 at any venue, the device detection system 140 may access the device profile to obtain the information contained in the device profile.

The ping logger 220 is configured to detect pings from mobile devices. The pings may comprise, for example, WiFi pings, Bluetooth pings, 3G/4G/5G pings, or any other suitable type of pings. The pings may be sent out by mobile devices at regular intervals or may be sent in response to a signal from the device detection system 140 or an access point associated with a venue. The ping logger 220 collects various parameters associated with the detected pings. The parameters may comprise a MAC address of the device, a time of the ping, and a signal strength of the ping. The ping logger 220 infers additional parameters regarding the ping, such as determining a device manufacturer based on the MAC address of the device. The ping logger 210 is configured to store the parameters in the ping log 230.

The ping log 230 is configured to store a history of pings and associated parameters detected by the device detection system. For each device profile in the device profile store 210, the ping log 230 stores data describing each ping detected from the devices. The ping log 230 may also store device parameters from the device profiles stored in the device profile store 210. The ping log 230 may store a time of the first ping and a time of the last ping detected from a device. The ping log 230 may calculate a dwell time based on a difference between the first ping time and the last ping time.

The device detection module 240 is configured to determine whether a detected device is located within a venue. The device detection module 240 is configured to generate the device detection model 250. In some embodiments, the device detection module 240 applies machine learning techniques to generate the device detection model 250 that, when applied to pings stored in the ping log 230, outputs indications of whether the device is located within a venue, such as probabilities that the pings have a particular Boolean property, or an estimated value of a scalar property.

As part of the generation of the device detection model 250, the device detection module 240 forms a training set of data including pings by identifying a positive training set of pings that have been determined to be received from a device located within a venue, and, in some embodiments, forms a negative training set of data including pings that have been determined to be received from a device not located within the venue.

The device detection module 240 extracts feature values from the pings of the training set, the features being variables deemed potentially relevant to whether or not the pings were received from a device located within the venue. Specifically, the feature values extracted by the device detection module 240 include a signal strength of a ping, a time of the ping, a dwell time between a first ping and a last ping from a device, whether the ping was received during hours of operation of the venue, a signal strength of pings from other devices that connected to the wireless access point, a manufacturer identifier of a MAC address of the device, and characteristics of data received from employee devices. An ordered list of the features for a ping is herein referred to as the feature vector for the ping. In one embodiment, the device detection module 240 applies dimensionality reduction (e.g., via linear discriminant analysis (LDA), principle component analysis (PCA), or the like) to reduce the amount of data in the feature vectors for pings to a smaller, more representative set of data.

In some embodiments, the device detection module 240 uses supervised machine learning to train the device detection model 250, with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The device detection model 250, when applied to the feature vector extracted from a ping, outputs an indication of whether the ping was received from a device within the venue, such as a Boolean yes/no estimate, or a scalar value representing a probability.

In some embodiments, a validation set is formed of additional pings, other than those in the training sets, which have already been determined to have been received from a device located within or outside of a venue. The device detection module 240 applies the trained validation device detection model 250 to the pings of the validation set to quantify the accuracy of the device detection model 250. Common metrics applied in accuracy measurement include: Precision=TP/(TP+FP) and Recall=TP/(TP+FN), where precision is how many the device detection model 250 correctly predicted (TP or true positives) out of the total it predicted (TP+FP or false positives), and recall is how many the device detection model 250 correctly predicted (TP) out of the total number of pings that were received from a device located within a venue (TP+FN or false negatives). The F score (F-score=2*PR/(P+R)) unifies precision and recall into a single measure. In one embodiment, the device detection module 240 iteratively re-trains the device detection model 250 until the occurrence of a stopping condition, such as the accuracy measurement indication that the model is sufficiently accurate, or a number of training rounds having taken place.

In some embodiments, the device detection model 250 may comprise a statistical model. Each device parameter may be assigned a score, such as a score from 1-100. Each device parameter may also be assigned a numerical weights, such as from 0-10. A weighted score may be calculated by combining the numerical weight with the parameter score, such as by multiplying the parameter score by the numerical weight. The weighted scores for all device parameters may be combined, such as by addition or averaging. The device detection module 240 may apply the device detection model 250 to pings in the ping log 230, and the device detection module may output a score representing a confidence value that the pings were received from a device located within a venue.

The web server 260 links the device detection system 140 via the network 120 to the one or more client devices 110, as well as to the one or more third party systems 130. One or more of the client devices 110 may be operated by a human or software device detection analyst. The device detection analyst may review device parameters and results output by the device detection system 140. The web server 260 serves web pages, as well as other content, such as JAVA®, FLASH®, XML and so forth. The device detection analyst may provide instructions to the device detection system 140 via the web server 260 to modify parameters of the device detection module 250 or to retrain the device detection model 250.

The identifier matching module 270 is configured to match anonymous identifiers to obtain information regarding users that received a content item for a venue and visited the venue. The identifier matching module 270 retrieves a set of device user identifiers from the device profile store 210. The device user identifiers may comprise an email address associated with the device, a MAC address of the device, a phone number associated with the device, a username, or some other identifying information describing a user or device. The identifier matching module 270 may retrieve device user identifiers for devices that were determined by the device detection module 240 to have visited the venue. The identifier matching module 270 may select device user identifiers for devices that visited the venue during a limited time period, such as during a certain day or certain week.

The identifier matching module 270 is configured to transmit the selected set of device user identifiers to the anonymization server 150. The identifier matching module 270 is configured to receive a set of anonymous identifiers from the anonymization server. Each anonymous identifier may correspond to one of the device user identifiers. However, the anonymous identifiers may not contain information that allows the device detection system 140 to determine which anonymous identifier corresponds to which device.

The identifier matching module 270 is configured to receive a set of anonymous identifiers from the content distribution system 160. The set of anonymous identifiers from the content distribution system 160 may correspond to users that received a content item for the venue. The identifier matching module 270 is configured to compare the set of anonymous identifiers from the anonymization server 150 to the set of anonymous identifiers from the content distribution server 160. For each anonymous identifier that is present in both sets of anonymous identifiers, that anonymous identifier is determined to be associated with a user that received a content item and visited the venue. For example, if the identifier matching module 270 receives 1,000 anonymous identifiers from the content distribution system 160, and the identifier matching module 270 determines that 100 of the anonymous identifiers are also present in the set of anonymous identifiers received from the anonymization server 150, the identifier matching module 270 may determine that 100 users received a content item and subsequently visited the venue. In some embodiments, the identifier matching module 270 may receive demographic information associated with the anonymous identifiers, such as user ages, genders, income levels, locations, etc. The identifier matching module 270 is configured to generate a report describing the number of users that received a content item and visited the venue. In some embodiments, the report may further comprise demographic information, as well as information describing purchases made at the venue.

Figure 3:
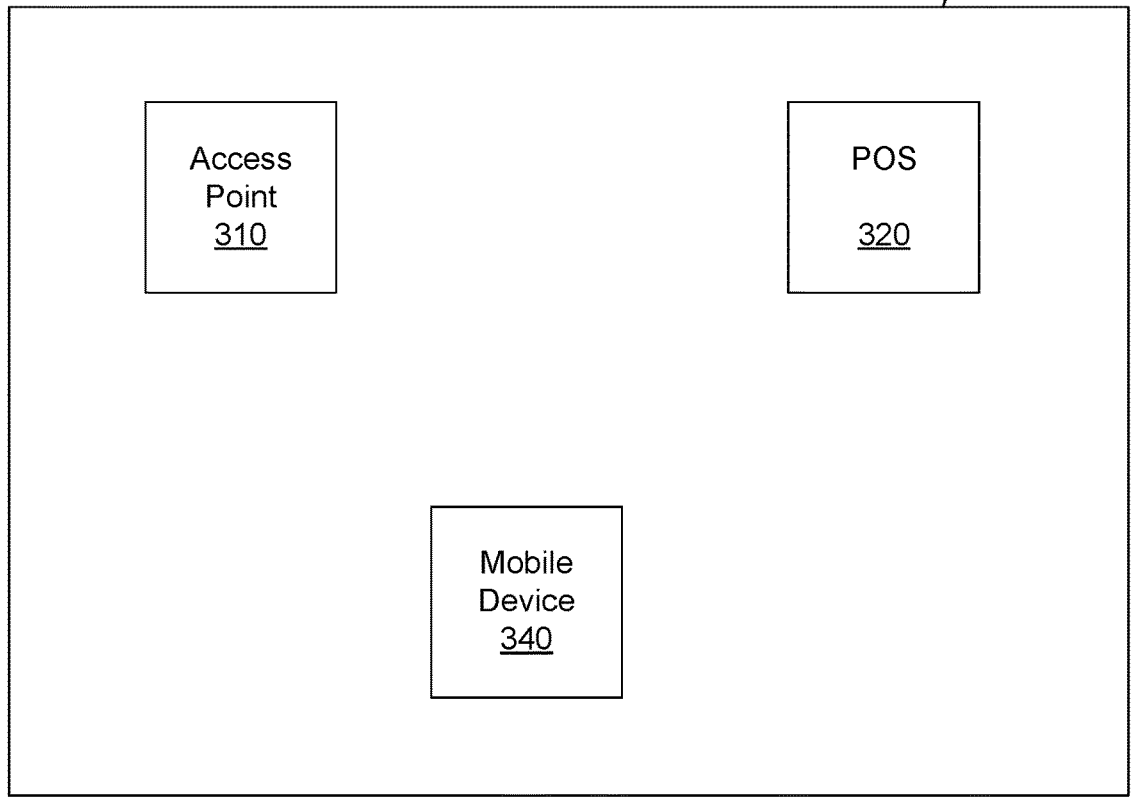
FIG. 3 is a schematic diagram of a device detection system operating within a venue, according to an embodiment.
Figure 3:
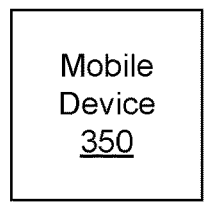

FIG. 3 illustrates a schematic diagram of a device detection system, such as the device detection system 140 of FIG. 2, operating within a venue 300. The venue 300 comprises an access point 310, a POS 320, and a venue boundary 330. A first mobile device 340 is located within the venue boundary 330, and a second mobile device 350 is located outside of the venue boundary 330.

The venue boundary 330 defines an area within which a mobile device is determined to be located within the venue 300. In some embodiments, the boundary may comprise a physical structure, such as: the walls, floor, and ceiling of a venue; a fenced area; or the edges of a paved area surrounding a structure. In some embodiments, the venue 300 may comprise one or more areas within the venue 300 defined by different boundaries. For example, a restaurant may comprise a bar area defined by a boundary around the bar, and a seating area defined by boundaries around the seating area. Similar, a grocery store or retail store may comprise boundaries around each department within the venue, such as boundaries around a floral department, clothing department, produce department, etc. In some embodiments, the boundary may comprise a legal boundary, such as the property lines of a property on which a venue is located. In some embodiments, the boundary may be defined by a distance from a point, such as a radius from the access point. Different types of boundaries may be useful for different types of venues. For example, for a retail store inside of a crowded mall, the boundaries may be defined to be the walls of the retail store. For a food truck, the boundary may be defined to be any area within 20 feet of an access point of the food truck.

The access point 310 is configured to provide a wireless LAN. The access point 310 is configured to detect pings from the mobile device 340 and the mobile device 350. In some embodiments, one or more of the mobile devices 340, 350 may connect to the wireless LAN provided by the access point 310.

The device detection system is configured to determine, by applying one or more models as described herein to information associated with the pings detected from the mobile devices 340, 350, whether the mobile devices are located within the venue boundary 330. In some embodiments, a user of the mobile device 340 may conduct a transaction at the POS 320. The device detection system may use the transaction as an input to a device detection model, such as the device detection model 250 of FIG. 2, to determine whether the mobile device 340 is located within the venue boundary 330. In some embodiments, the device detection system may use the transaction as a ground truth confirmation that the mobile device 340 is located within the venue boundary 330.

Method for Generating a Device Detection Model

Figure 4:
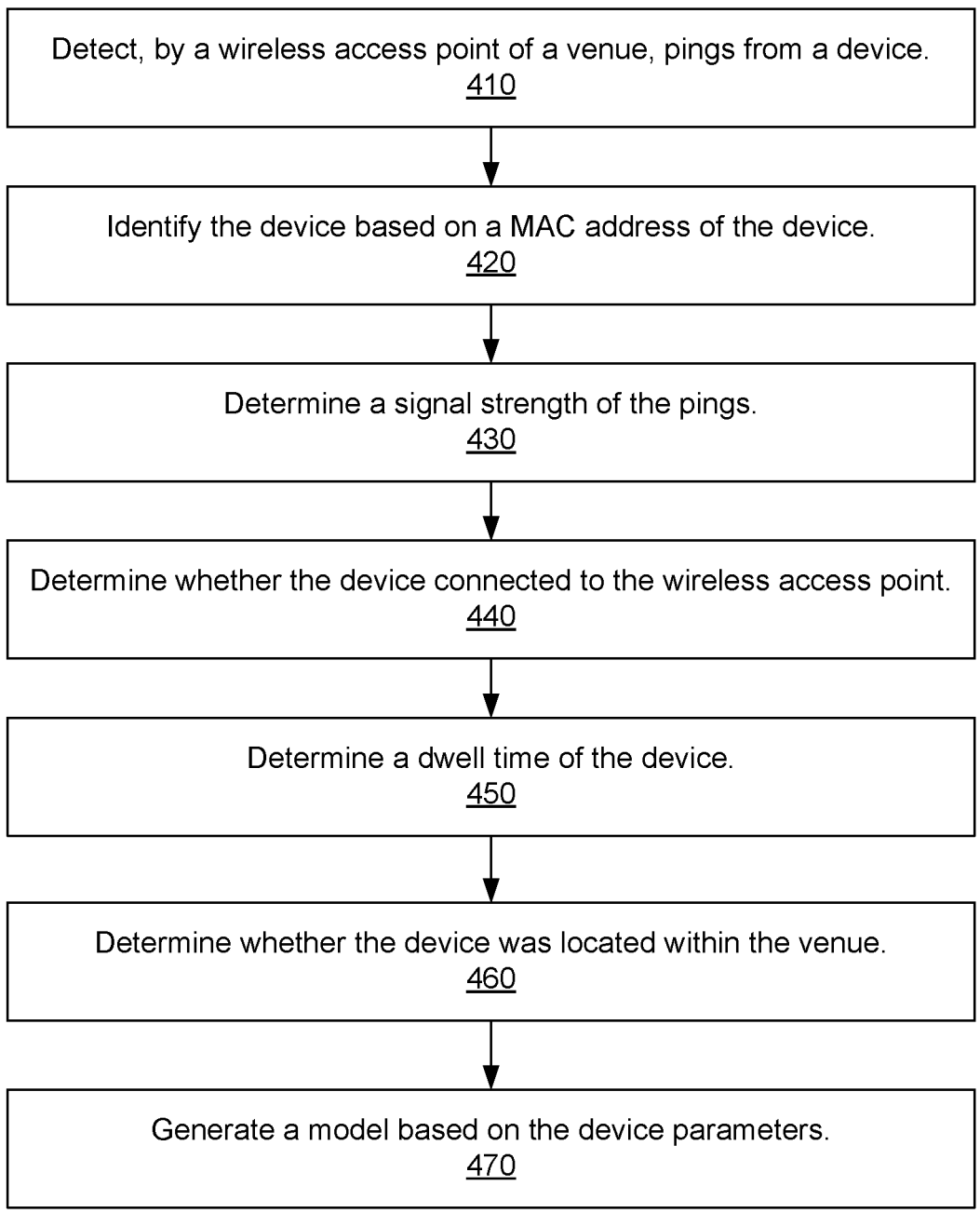
FIG. 4 is a flowchart of a method for training a machine-learning model for detecting a location of a device, according to an embodiment.

FIG. 4 is a flowchart 400 of a method for generating a device detection model, in accordance with an embodiment. In various embodiments, the method includes different or additional steps than those described in conjunction with FIG. 4. Further, in various embodiments, the steps of the method may be performed in different orders than the order described in conjunction with FIG. 4. The method described in conjunction with FIG. 4 may be carried out by the device detection system 140 in various embodiments.

The device detection system detects 410 pings from a device. The pings may be detected by a wireless access point located within a venue. In some embodiments, the pings may be detected by multiple wireless access points located within the venue. The pings may be detected from devices located within the venue, as well as from devices located outside the venue. The pings may be detected during a baseline time period. For example, a baseline time period may comprise a week, a day, or any other suitable length of time to train a device detection model.

The device detection system identifies 420 a device based on a MAC address of the device. Each ping detected from a device may comprise a MAC address that uniquely identifies the device. Any subsequent pings detected from the device may be grouped with all pings containing the specific device to create a set of pings associated with the device.

The device detection system determines 430 a signal strength of the pings. The signal strength may be proportional to the distance from the device to the wireless access point. Thus, a stronger signal strength may indicate that the device is relatively closer to the wireless access point and more likely to be located within the venue. For example, a signal strength of a first value may indicate that a device is closer to the wireless access point than a signal strength of a second value lower than the first value. In some embodiments, the device detection system determines a different signal strength from different wireless access points within the venue, and the device detection system may calculate possible device locations based on the different signal strengths.

The device detection system may determine 440 whether the device connected to the wireless access point. The wireless access point provides a wireless LAN that devices may connect to. A user of the access point may be prompted to provide a username, email address, or other information in order to connect to the wireless access point. The device detection system may also obtain the MAC address of the device connecting to the wireless access point, and the device detection system may associate the connection with pings detected from the device with the same MAC address. A device connecting to the wireless access point may be determined to be more likely to be located within the venue than a device that did not connect to the wireless access point.

The device detection system may determine 450 a dwell time of the device. The dwell time may be the difference between a first time that a ping is detected from the device and a last time that a ping is detected from the device. A longer dwell time may increase the likelihood that the device is located within the venue, as opposed to a shorter dwell time which may indicate that a user of a device walked by the venue without entering the venue.

In some embodiments, the device detection system may start a new set of pings for the device in response to an elapsed time between pings. For example, if the device detection system does not detect a ping for at least five minutes from a device, the device detection system may save previously detected pings from the device as a complete set. Any subsequent pings from the device may be stored as a new set. Thus, if a device leaves the area of the wireless access point and subsequently returns, a first dwell time may be saved for the first set of pings, and a new dwell time may be calculated for subsequently detected pings.

The device detection system determines 460 whether the device was located within the venue. The device detection system may determine whether the device was located within a specific area within the venue. The set of training data for the device detection system may include a footprint or floor layout for a venue. Additionally, the set of training data may include the location of any access points within the venue, the boundaries around any specific areas within the venue, the location of any entrances/exits of the venue, and the location of any structures within the venue. The device detection system evaluates the device parameters to determine whether the device was located within the venue. The device detection system may evaluate the device parameters to determine whether the device was located within a specific area within the venue. In some embodiments, the device detection system may determine a time that a device entered the venue and a time that the device exited the venue. The device detection system may calculate a duration that the device was located within the venue based on the enter and exit times. In some embodiments, a human evaluator may evaluate the device parameters and input a determination of whether the device is located within the venue.

In addition to the signal strength, a connection to the wireless access point, and the dwell time, the device detection system evaluates any additional available device parameters to determine whether or not a device has entered the venue. For example, the device detection system may determine whether the device is a device of an employee. If the device is a device of an employee, it may increase the likelihood that the device is located within the venue. The device detection system may determine whether the pings were detected during open or closed hours of the venue. Pings detected during open hours of the venue may be more likely to be from a device located within the venue than pings detected during closed hours of the venue. In some embodiments, a manufacturer identifier of a MAC address of the device may affect the likelihood that the device was located within the venue. For example, a manufacture identifier may indicate that the device is an automobile, and the device detection system may determine that it is unlikely that a vehicle would be located within the venue. In contrast, a manufacturer identifier may indicate that the device is a mobile phone, and the device detection system may determine that it is likely that the device could be located within the venue. In some embodiments, the device detection system may determine whether a user of the device conducted a transaction at a POS located within the venue. The user may conduct the transaction using the mobile device, or the user may conduct the transaction using a transaction instrument, such as a credit card, and the transaction may be linked to the user of the device. In response to the user of the device conducting the transaction at the POS, the device detection system may determine that it is likely that the device is located within the venue.

The device detection system generates 470 a model based on the device parameters. The model is configured to determine, based on device parameters for pings detected by one or more access points, whether a device is located within the venue. In some embodiments, the model is configured to output a positive or negative indication of whether the device is located within the venue. In some embodiments, the model is configured to output a confidence score indicating a probability that the device is located within the venue. For example, the confidence score may be between 0-100%. In some embodiments, a human evaluator may assign weights to each device parameter to generate a statistical model. In some embodiments, linear regression analysis may be applied to the device parameters to determine which device parameters are most indicative of whether the device was located within the venue. In some embodiments, a machine learning model may be trained based on the device parameters. Ground truth values may be obtained from POS data, employee device data, or human inputs indicating whether a device was actually located within the venue.

In some embodiments, ground truth values may be obtained during closed store hours. All detected pings during closed store hours may be determined be from devices located outside the venue. In some embodiments, exceptions may be made for devices that are authorized to be located within the venue during closed store hours. Device profiles in the device profile store may indicate whether a device is authorized to be located within the venue during closed store hours. For example, employees or contractors, such as security or cleaning staff, may be authorized to be located within the venue during store hours. Additionally, inventory or venue equipment located within the venue that emit pings may be authorized devices. Thus, all detected pings from devices, except for authorized devices, may be determined to be located outside the venue during closed store hours.

Figure 5:
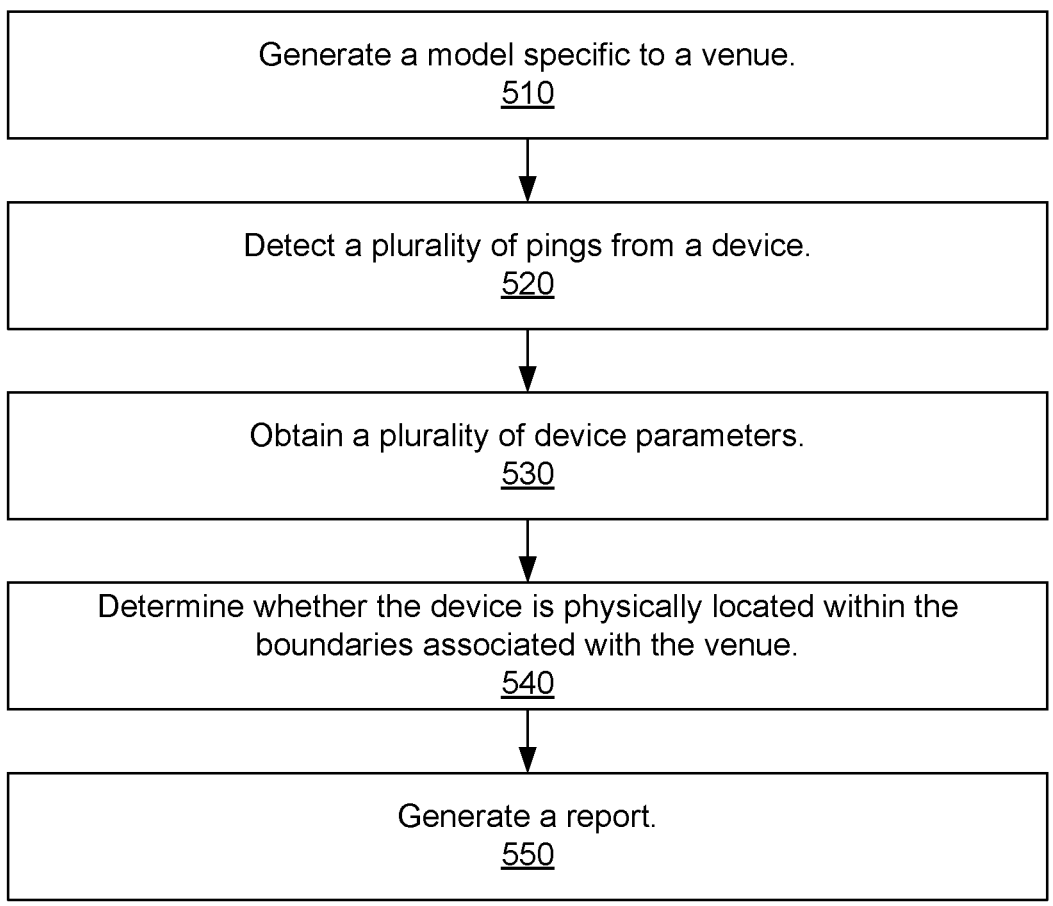
FIG. 5 is a flowchart of a method for detecting a location of a mobile device, according to an embodiment.

FIG. 5 is a flowchart 500 of a method for determining whether a device is located within a venue, in accordance with an embodiment. In some embodiments, the method may be a continuation of the method described with respect to FIG. 4. In various embodiments, the method includes different or additional steps than those described in conjunction with FIG. 5. Further, in various embodiments, the steps of the method may be performed in different orders than the order described in conjunction with FIG. 5. The method described in conjunction with FIG. 5 may be carried out by the device detection system 140 in various embodiments.

The device detection system generates 510 a model specific to a venue. The model may be a machine learning model. The model may be generated in accordance with the method described with reference to FIG. 4. The machine learning model is configured to determine, based on device parameters of a mobile device, whether a mobile device is physically located within boundaries associated with the venue.

The device detection system detects 520 a plurality of pings from a device. The pings may be detected by a wireless access point located within the venue.

The device detection system obtains 530 a plurality of device parameters for the device. Or more of the device parameters may be obtained based on the pings detected from the device. For example, the device parameters may comprise at least one of: a signal strength of a ping, a time of the ping, a dwell time between a first ping and a last ping from a device, whether the ping was received during hours of operation of the venue, or a manufacturer identifier of a MAC address of the device. In some embodiments, one or more of the device parameters may be obtained from a device profile or other data store. For example, the device parameters may comprise at least one of: whether the device is an employee device, whether the device is an authorized device, a signal strength of pings from other devices that connected to the wireless access point, and characteristics of data received from employee devices. The device detection system may cross-reference device parameters against other systems, such as POS systems, reservation systems, and loyalty systems that may provide additional indicators of whether a device was located within a venue.

The device detection system determines 540 whether the device is physically located within the boundaries associated with the venue by applying the machine learning model to the plurality of device parameters. The machine learning model is configured to output a determination of whether the device is physically located within the boundaries. In some embodiments, the output determination may comprise binary determination, such as a yes or no indication of whether the device is located within the boundaries. In some embodiments, the output determination may comprise a confidence score representative of a likelihood that the device is located within the boundaries associated with the venue. In some embodiments, the output determination may comprise a confidence band covering a range of likelihoods that the device is located within the boundaries.

The device detection system generates 550 a report based on the output from the machine learning model. In some embodiments, the report may comprise output determinations for a plurality of devices. For example, the report may list all devices from which a ping was detected during a time period, such as a day. The report may indicate determinations of which of the devices were located within the venue. In some embodiments, the report may comprise an indication of which devices, or which users of devices, received a content item for the venue.

The venue or other analysts may use the report to analyze the traffic within the venue. For example, the report may inform the venue of the number of visitors to the venue, the number of people that walked by the venue without entering, the length of time people spent in the venue, the effectiveness of advertisement campaigns, or other information which may be valuable to the venue.

In some embodiments, the model may be adjusted or retrained based on the report. For example, an analyst may review the generated report, and the analyst may determine that the report is below a desired quality threshold. The analyst may adjust one or more of the device parameters or weights in order to adjust the model. In some embodiments, the analyst may mark an output determination of the machine learning model as incorrect, and the machine learning model may retrain based on the new data.

In some embodiments, the model may be retrained or adjusted in response to a triggering event. In some embodiments, a triggering event may comprise a change in a physical aspect of the venue. For example, in response to the wireless access point being replaced or moved within the store, or in response to the addition or removal of a wireless access point, the model may be retrained. Similarly, in response to a change in location of walls or boundaries of the venue, or in response to a change in store hours, the model may be retrained. In some embodiments, the model may be retrained periodically, such as once per month or once per year, on an ongoing basis.

The systems and methods described herein provide valuable information to venues describing the presence of users within the venue. By detecting the presence of devices using wireless pings, the systems are able to accurately identify the presence of users within the venue. Additionally, the presence of devices may be detected without users taking any action on the device, such as enabling location or interacting with an application. Furthermore, device presence may be detected three-dimensionally, as opposed to location mechanisms such as GPS, which may provide an identical location of a device on a first story of a building versus the tenth story of the building.

Figure 6:
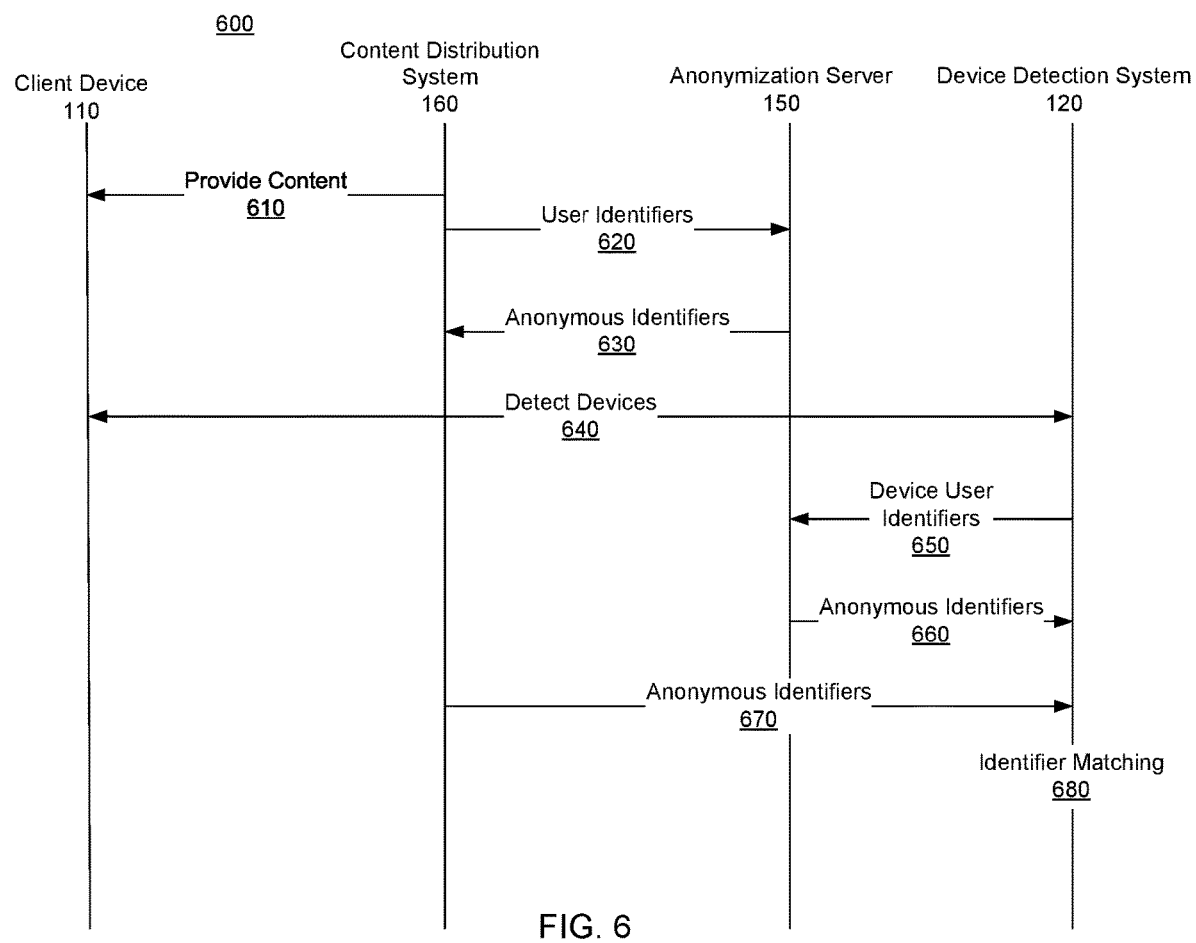
FIG. 6 is an action diagram of a method for detecting a location of mobile devices that have received content, according to an embodiment.

FIG. 6 illustrates an action diagram 600 of a method for detecting a location of mobile devices that have received content, according to an embodiment. The content distribution system 160 provides 610 content items to one or more client devices 110. The content items may comprise digital advertisements, articles, videos, images, or any other suitable type of digital information which may be presented on a client device 110. The content items may be provided as part of a campaign on behalf of an entity. The entity may instruct the content distribution system 160 to target the content items to a set of users that meet targeting criteria. For example, the targeting criteria may be defined by demographic information, such as user ages, genders, income levels, locations, etc. In some embodiments, the targeting criteria may be partially determined based on previous user visits. For example, the device detection system 120 may provide a list of user identifiers for client devices 110 that have previously visited a venue, and the targeting criteria may exclude users that have previously visited a venue. Thus, the campaign may be targeted only to new customers of an entity in order to increase new user visits. Conversely, a campaign may be targeted to existing customers in order to increase repeat visits.

In some embodiments, the content distribution system 160 may transmit a tracking pixel, also referred to as a cookie, to the client device 110. The tracking pixel may comprise a cookie value, which may be an alphanumeric string that uniquely identifies the client device 110. The tracking pixel may allow the content distribution system 160 to store browsing history data from the client device 110, such as webpage views, clickstream data, etc. The content distribution system 160 may infer user interests based on the data collected via the tracking pixel. The targeting criteria used to target the content items may include data collected via the tracking pixel, such as the webpage views, clickstream data, user interests, etc.

The content distribution system 160 transmits 620 user identifiers to the anonymization server 150. The content distribution system 160 may transmit one user identifier for each client device 110 that received a content item in conjunction with an entity campaign. In some embodiments, the user identifier may comprise an email address associated with the client device 110, a user name associated with the client device 110, a cookie value associated with the client device 110, or any other suitable identifier that uniquely identifies the client device 110 or a user associated with the client device 110. The content distribution system 160 may transmit a set of user identifiers for each client device 110 that received a specific content item. For example, an entity campaign may include multiple different content items, and for each content item in the entity campaign, the content distribution system 160 may transmit a separate set of user identifiers. In some embodiments, for each user identifier, the content distribution system 160 may transmit data indicating which content item the client device 110 received, when the client device 110 received the content item, how many times the client device 110 received the content item, whether the user of the client device 110 interacted with the content item (e.g., clicked on the content item, shared the content item, made an online purchase after clicking on the content item, etc.), or any other suitable data describing the user's interaction with the content item.

In some embodiments, multiple content distribution systems 160 may provide content to client devices 110 and user identifiers to the anonymization server 150. Each content distribution system 160 may independently perform the actions described throughout the process described in FIG. 6.

The anonymization server 150 transmits 630 anonymous identifiers to the content distribution system 160. For each user identifier received from the content distribution system 160, the anonymization server 150 may determine whether the anonymization server has a stored user profile corresponding to the user identifier. The user profile may comprise an anonymous identifier generated by the anonymization server 150. If the anonymization server 150 does not have a stored user profile for the user identifier, the anonymization server 150 may create a new user profile and generate a new anonymous identifier. The anonymization server 150 may not share the association between the anonymous identifier and the user identifier with other entities. In other words, another entity that obtains the anonymous identifier without other identifying information may not be able to identify the client device 110 or user of the client device. For each set of user identifiers received from the content distribution system 160, the anonymization server 150 transmits a corresponding set of anonymous identifiers to the content distribution system 160. However, the anonymization server 150 does not indicate which anonymous identifier corresponds to which user identifier.

The device detection system 120 detects 640 client devices 110 that have visited a venue. The device detection system 120 may use a model, such as a machine learning model, to detect the client devices 110, as described in detail herein with respect to FIGS. 2-5. For each detected client device 110, the device detection system 120 obtains a device user identifier. The device user identifiers may comprise a MAC address, an email address, a user name, or some other identifier that uniquely identifiers the client device 110 or a user of the client device 110. In some embodiments, the device detection system 120 may obtain user identifiers based on POS data. For example, the device detection system 120 may obtain a user name and zip code based on a POS transaction by a user, and the device detection system 120 may provide the user name and zip code as a device user identifier, or the device detection system 120 may use the user name and zip code to identify a stored device profile, and the device detection system 120 may obtain a device user identifier, such as an email address, from the stored device profile.

In some embodiments, the detected client device 110 may be the same client device 110 which received content from the content distribution system 160. However, a single user may be associated with multiple client devices 110, such as a cellphone and a laptop computer. In some embodiments, the content may have been provided to the user's laptop computer, and the user's cellphone may be detected by the device detection system.

The device detection system 120 transmits 650 device user identifiers 650 to the anonymization server 150. The device detection system 120 may collect a set of device user identifiers 650 obtained during a collection period, which may correspond to all or a portion of a entity campaign.

The anonymization server 150 transmits 660 anonymous identifiers to the device detection system 120. For each device user identifier received from the device detection system 120, the anonymization server 150 may determine whether the anonymization server has a stored user profile corresponding to the device user identifier. The user profile may comprise an anonymous identifier generated by the anonymization server 150. If the anonymization server 150 does not have a stored user profile for the device user identifier, the anonymization server 150 may create a new user profile and generate a new anonymous identifier. For each set of device user identifiers received from the device detection system 120, the anonymization server 150 transmits a corresponding set of anonymous identifiers to the device detection system 120. However, the anonymization server 150 does not indicate which anonymous identifier corresponds to which device user identifier.

The content distribution system 160 transmits 670 anonymous identifiers to the device detection system. The anonymous identifiers are the anonymous identifiers received from the anonymization server 150 in step 630. The content distribution system 160 may provide additional information with each set of anonymous identifiers transmitted to the device detection system 120. For example, the additional information may comprise which targeting criteria was used to obtain the anonymous identifiers. Additionally, the additional information may comprise data indicating which content item the client device 110 received, when the client device 110 received the content item, how many times the client device 110 received the content item, whether the user of the client device 110 interacted with the content item (e.g., clicked on the content item, shared the content item, made an online purchase after clicking on the content item, etc.), or any other suitable data describing the user's interaction with the content item.

In some embodiments, the additional data may be aggregated over each set of anonymous identifiers provided to the device detection system 120. Thus, the device detection system 120 may not know specifically which client device 110 associated with an anonymous identifier performed which action, but the device detection system 120 may receive data indicating that, within a set of anonymous identifiers, the client devices 110 received a specific content item, the demographic information of the users of the client devices 110, and percentages of the client devices 110 that performed different interactions with the content item.

The device detection system 120 performs 680 an identifier matching process. The device detection system 120 identifies which anonymous identifiers are present in both the anonymous identifiers received from the anonymization server 150 in step 660 as well as the anonymous identifiers received from the content distribution system 160 in step 670. For each matching anonymous identifier, the device detection system 120 determines that a client device 110 corresponding to the anonymous identifier received a content item from the content distribution system 160 and subsequently visited a venue.

The device detection system 120 may generate a report describing the matching anonymous identifiers. The device detection system 120 may provide the report to an entity associated with a venue. For example, the report may describe the number of determined matching identifiers. The report may describe the percentage of anonymous identifiers received from the content distribution system 160 that had a matching anonymous identifier received from the anonymization server 150, which may indicate the percentage of users that received a content item and subsequently visited the venue. The report may comprise demographic information describing the users that received the content item, the users that interacted with the content item, and the users that visited a venue after receiving the content item. The demographic information of users that interacted with a content item may be significantly different than the demographic information of users that visited a venue after receiving the content item. Thus, for an entity attempting to drive foot traffic to a venue with a campaign, the user data describing interaction with a content item may be less valuable than the user data describing visits to the venue. In some embodiments, the report may indicate the number of new users that visited a venue after receiving the content item. The report may describe the durations between users receiving a content item and subsequently visiting a venue.

In some embodiments, the device detection system 120 may transmit multiple sets of device user identifiers to the anonymization server 150 and receive multiple corresponding sets of anonymous identifiers over time. Each time a specific client device 110 is detected by the device detection system 120, the device detection system 120 may receive the same anonymous identifier from the anonymization server 150. Thus, the device detection system 120 may identify anonymous identifiers that visit a venue multiple times, and the report may describe the number and timing of venue visits that a client device 110 corresponding to an anonymous identifier. A user that visits a venue multiple times in response to receiving a content item may be determined to have a greater value to an entity than a user that visits a venue one time in response to receiving a content item, thus the report may indicate which targeting criteria used for a content item resulted in greater value to the entity. The entity may use such information for future campaigns to more effectively target content item to users.

In some embodiments, the report may segregate information based on a specific venue visited by a user. For example, one entity conducting a campaign may be associated with multiple physical venues. The device detection system 120 may detect devices in multiple venues and determine which anonymous identifiers correspond to client devices 110 that visited which specific venue. Thus, an entity may be able to determine which specific venues received visits resulting from a content item provided to a user.

In some embodiments, the report may describe visits detected before, during, and after a campaign. For example, the after the conclusion of a campaign, the device detection system 120 may determine differences in the number or demographic characteristics of user visits compared to the user visits during the campaign.

In some embodiments, future content may be provided to any client device associated with a user. For example, based on an anonymous identifier associated with a device determined to have been located within the venue, subsequent content may be provided to any device associated with the anonymous identifier.

The systems described herein provide valuable insight to entities regarding the effectiveness of a digital campaign to drive foot traffic into a physical venue. The entities may use such information to modify subsequent campaigns to more effectively increase foot traffic to their venues.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A non-transitory computer readable storage medium comprising stored instructions, the instructions when executed cause at least one processor to:
   detect, by a wireless access point of a venue, a plurality of pings from a plurality of devices;
   determine, based on the plurality of pings, that the plurality of devices are located within the venue;
   obtain, for each of the plurality of devices, a device user identifier associated with a user of each device;
   transmit the device user identifiers to an anonymization server;
   receive, from the anonymization server, a first set of anonymous identifiers corresponding to the device user identifiers;
   receive, from a content distribution system, a second set of anonymous identifiers corresponding to users that were served content by the content distribution system;
   select a subset of the plurality of devices corresponding to users that were served content by the content distribution system and that subsequently visited the venue by identifying anonymous identifiers common to both the first set of anonymous identifiers and the second set of anonymous identifiers; and
   provide, to an entity associated with the venue, a report comprising demographic information for the selected subset of the plurality of devices.

2. The non-transitory computer readable storage medium of claim 1, wherein the content distribution system receives the second set of anonymous identifiers from the anonymization server.

3. The non-transitory computer readable storage medium of claim 1, wherein the plurality of devices are determined to be located within the venue based on a plurality of device parameters comprising at least one of: a signal strength of a ping, a time of the ping, a dwell time between a first ping and a last ping from a device, hours of operation of the venue, a signal strength of pings from devices that connected to the wireless access point, a manufacturer identifier of MAC address, or employee device data.

4. The non-transitory computer readable storage medium of claim 1, wherein the anonymization server converts each device user identifier into a corresponding anonymous identifier.

5. The non-transitory computer readable storage medium of claim 1, wherein the instructions when executed cause the at least one processor to determine a number of times that a user in the number of users visited the venue after receiving content corresponding to the venue.

6. The non-transitory computer readable storage medium of claim 1, wherein the instructions when executed cause the at least one processor to identify, from the subset of the plurality of devices, new devices which had not previously visited the venue.

7. The non-transitory computer readable storage medium of claim 1, wherein the instructions when executed cause the at least one processor to:
   determine, based on a ping, a MAC address of the device; and
   obtain the device user identifier based on the MAC address of the device.

8. A method comprising:
   detecting, by a wireless access point of a venue, a plurality of pings from a plurality of devices;
   determining, based on the plurality of pings, that the plurality of devices are located within the venue;
   obtaining, for each of the plurality of devices, a device user identifier associated with a user of each device;
   transmitting the device user identifiers to an anonymization server;
   receiving, from the anonymization server, a first set of anonymous identifiers corresponding to the device user identifiers;
   receiving, from a content distribution system, a second set of anonymous identifiers corresponding to users that were served content by the content distribution system;

selecting a subset of the plurality of devices corresponding to users that were served content by the content distribution system and that subsequently visited the venue by identifying anonymous identifiers common to both the first set of anonymous identifiers and the second set of anonymous identifiers; and providing, to an entity associated with the venue, a report comprising demographic information for the selected subset of the plurality of devices.

9. The method of claim 8, wherein the content distribution system receives the second set of anonymous identifiers from the anonymization server.

10. The method of claim 8, wherein the plurality of devices are determined to be located within the venue based on a plurality of device parameters comprising at least one of: a signal strength of a ping, a time of the ping, a dwell time between a first ping and a last ping from a device, hours of operation of the venue, a signal strength of pings from devices that connected to the wireless access point, a manufacturer identifier of MAC address, or employee device data.

11. The method of claim 8, wherein the anonymization server converts each device user identifier into a corresponding anonymous identifier.

12. The method of claim 8, further comprising determining a number of times that a user in the number of users visited the venue after receiving content corresponding to the venue.

13. The method of claim 8, further comprising identifying, from the subset of the plurality of devices, new devices which had not previously visited the venue.

14. The method of claim 8, further comprising:
determining, based on a ping, a MAC address of the device; and
obtaining the device user identifier based on the MAC address of the device.

15. A system comprising:
a hardware processor; and
a non-transitory computer-readable storage medium storing executable instructions that, when executed by the hardware processor, cause the hardware processor to perform steps comprising:
detecting, by a wireless access point of a venue, a plurality of pings from a plurality of devices;
determining, based on the plurality of pings, that the plurality of devices are located within the venue;
obtaining, for each of the plurality of devices, a device user identifier associated with a user of each device;
transmitting the device user identifiers to an anonymization server;
receiving, from the anonymization server, a first set of anonymous identifiers corresponding to the device user identifiers;
receiving, from a content distribution system, a second set of anonymous identifiers corresponding to users that were served content by the content distribution system;
selecting a subset of the plurality of devices corresponding to users that were served content by the content distribution system and that subsequently visited the venue by identifying anonymous identifiers common to both the first set of anonymous identifiers and the second set of anonymous identifiers; and
providing, to an entity associated with the venue, a report comprising demographic information for the selected subset of the plurality of devices.

16. The system of claim 15, wherein the content distribution system receives the second set of anonymous identifiers from the anonymization server.

17. The system of claim 15, wherein the plurality of devices are determined to be located within the venue based on a plurality of device parameters comprising at least one of: a signal strength of a ping, a time of the ping, a dwell time between a first ping and a last ping from a device, hours of operation of the venue, a signal strength of pings from devices that connected to the wireless access point, a manufacturer identifier of MAC address, or employee device data.

18. The system of claim 15, wherein the anonymization server converts each device user identifier into a corresponding anonymous identifier.

19. The system of claim 15, wherein the instructions when executed cause the at least one processor to determine a number of times that a user in the number of users visited the venue after receiving content corresponding to the venue.

20. The system of claim 15, wherein the instructions when executed cause the at least one processor to identify, from the subset of the plurality of devices, new devices which had not previously visited the venue.

* * * * *